No. 883,967. PATENTED APR. 7, 1908.
B. LOUTZKY.
WATER COOLED VALVE FOR INTERNAL COMBUSTION MOTORS.
APPLICATION FILED NOV. 20, 1907.
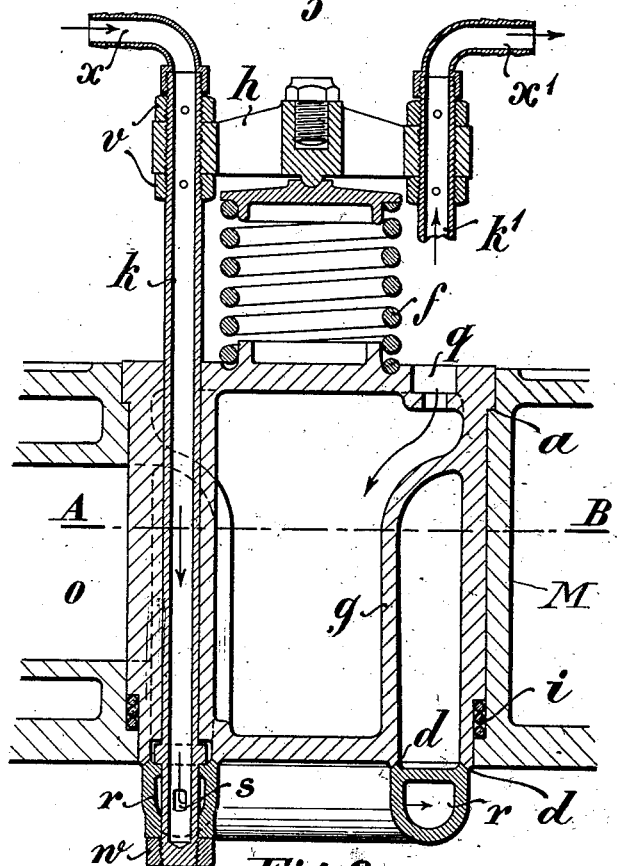
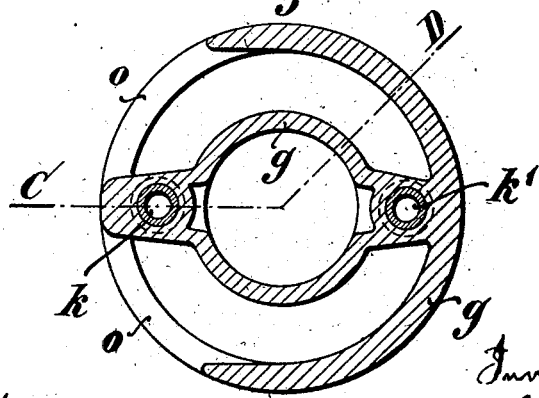

UNITED STATES PATENT OFFICE.

BORIS LOUTZKY, OF BERLIN, GERMANY.

WATER-COOLED VALVE FOR INTERNAL-COMBUSTION MOTORS.

No. 883,967.  Specification of Letters Patent.  Patented April 7, 1908.

Application filed November 20, 1907. Serial No. 403,067.

*To all whom it may concern:*

Be it known that I, BORIS LOUTZKY, of Berlin, Germany, a subject of the Emperor of Russia, and whose post-office address is No. 5 Unter den Linden, Berlin, Prussia, German Empire, have invented new and useful Improvements in Water-Cooled Valves for Internal-Combustion Motors, of which the following is a specification.

The invention relates to a water-cooled valve for internal combustion motors and especially for high power motors (200 H. P. and over) designed to run at high speeds. It is difficult to obtain a perfect joint between such valves and their valve seats, especially when valves are used which with a small lift have a passage of large cross section and which are wholly or partially balanced. In order to attain this object of a perfect joint with the valve seat in as complete a manner as possible the valve in accordance with the present invention comprises a hollow ring cooled by a current of water which is conducted through the guide stems of the valve and through the hollow valve ring in such a manner that the cooling current circulates through the guide stems and the valve entering at one point and discharging at another point.

In the accompanying drawings, which form a part of this specification, Figure 1 is a longitudinal section on the line C—D of Fig. 2, and Fig. 2 is a cross section on the line A—B of Fig. 1.

Referring to Figs. 1 and 2, $r$ is a hollow ring body forming the valve at $d$ and provided with ground joint faces meeting similar faces on the valve-seat $g$. The hollow ring $r$ is guided by two hollow stems or spindles $k$ and $k^1$ which are fixed by means of nuts $w$ to the ring-body $r$ of the valve, and supported above by nuts $v$ from a cross piece $h$. This cross piece is normally held up by the action of a spring $f$ which tends to press the cross piece $h$ and with it the stems or spindles $k$ and $k^1$ together with the valve ring $r$ upward, and force the valve against the joint faces $d$ of the valve seat body $g$. Within the ring body $r$ the spindle $k$ is provided with a side-opening $s$. The spindle $k^1$ (partly broken away in Fig. 1) is connected with the ring-body $r$ and also provided with a side-opening within the ring-body exactly in the same manner as the spindle $k$. The spring $f$ between the cross piece $h$ and the valve seat body $g$ may readily be removed by compressing it so as to disengage it from the cross head, and so may be easily mounted and dismounted.

In order to protect the valve seat body $g$ from deformation by the varying temperature it is fastened in the valve casing M at $a$ above the passages $o$, (see Fig. 2) while a packing $i$ forms an elastic stuffing box around the lower portion of the seat body $g$ so that it is able to expand downwards. Each of the hollow spindles $k$ and $k^1$ are provided with a nipple or connection $x$ and $x^1$ respectively to which the cooling water pipe may be fitted. The cooling water enters through the nipple $x$, traverses the spindle $k$ and passing through the side opening $s$, and into the hollow ring $r$, is discharged at the other side through the side opening of the spindle $k^1$, then through the latter and the discharge nipple $x^1$. The valve seat body may be provided with an opening $q$ to which a cooling water pipe can be fitted.

What I claim, and desire to secure by Letters Patent of the United States, is:—

1. The combination of a valve seat body, an annular valve, two guide stems therefor passing through the seat body, a cross piece connecting the outer ends of the guide stems and a spring confined between the cross piece and the seat body.

2. The combination of a valve seat body, an annular valve, two guide stems therefor passing through the seat body, a cross piece connecting the outer ends of the guide stems and a spring detachably mounted between the cross piece and the seat body.

3. A valve comprising a hollow ring, and means for supplying a cooling fluid to the ring at one point and discharging it at another, said means comprising hollow guide spindles connected to the ring at different points, together with a hollow seat body for said valve provided with an opening for the admission of a cooling fluid.

In testimony whereof I have hereunto set my hand in presence of two subscribing witnesses.

BORIS LOUTZKY.

Witnesses:
 HENRY HASPER,
 WOLDEMAR HAUPT.